United States Patent [19]

Fitz

[11] 4,319,246
[45] Mar. 9, 1982

[54] RADAR SYSTEMS

[75] Inventor: Philip J. Fitz, Baddow, England

[73] Assignee: The Marconi Company Limited, Chelmsford, England

[21] Appl. No.: 706,482

[22] Filed: Jul. 21, 1976

[30] Foreign Application Priority Data

May 1, 1976 [GB] United Kingdom ............ 17885/76

[51] Int. Cl.³ .............................................. G01S 7/28
[52] U.S. Cl. .............................................. 343/17.1 R
[58] Field of Search ........................... 343/5 R, 17.1 R

[56] References Cited

U.S. PATENT DOCUMENTS 2,737,655  3/1956  Dolberg .................... 343/5 R X
3,997,897  12/1976 Brunner et al. ............. 343/6 R X Primary Examiner—T. H. Tubbesing
Attorney, Agent, or Firm—Diller, Ramik & Wight

[57] ABSTRACT

The invention provides a radar system in which the average power output of the radar transmitter is increased to a value above its rated mean power during a dwell time during which the radar beam traverses a target of interest. The system includes a power supply arrangement which is operative normally to supply power to the transmitter and means for supplementing the power supply during periods in which the average power output of the transmitter is increased. In one embodiment the normally operative power supply consists of a plurality of individual power supplying inverters arranged normally to supply power to the transmitter sequentially and in turn, but in unison during periods in which the average power output is increased. In the output path of each inverter is included a re-circulatory current inductive circuit such that current tends to be maintained after the inverter ceases to supply power in its turn.

10 Claims, 1 Drawing Figure

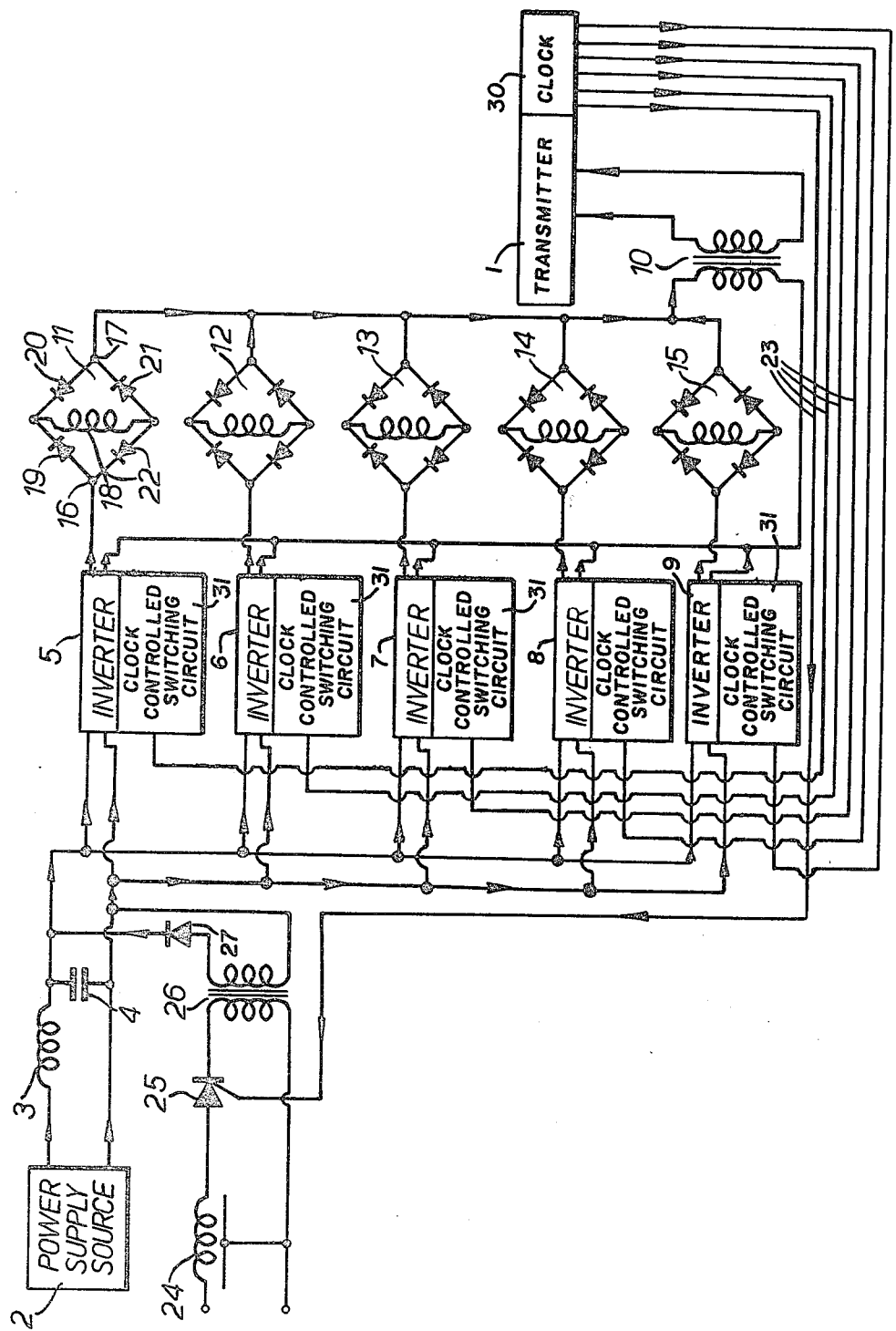

RADAR SYSTEMS

This invention relates to radar systems.

Simple radar systems utilize a rotating antenna which rotates at a constant rate so as to spread the energy transmitted equally over all bearings. However, it is sometimes desirable that energy should be concentrated on a specific bearing on which lies a target of interest. Radar systems capable of functioning in this manner are usually complex and expensive. One such radar system utilizes a phased array antenna which utilizes electronic control for the position of the radar beam. Another such radar system is such that the beam angle is frequency dependent and use is made of a frequency swept transmission which effectively cancels out the antenna rotation to produce a lengthened dwell time on the target of interest. In both cases the cost and complexity is increased and constraints are imposed upon the radar frequency. In the case of a phased array the settings of phase shifters have to be changed for each new frequency and in cases where the beam angle is frequency dependent, the frequency/scan constraint is at least equally restrictive. Furthermore, it is not possible to combine either of these known solutions with wide band simultaneous frequency diversity.

One object of the present invention is to provide an improved relatively simple radar system in which one or more of the above disadvantages is reduced.

According to this invention, a radar system is provided which comprises a radar transmitter, means for increasing the average power output of the radar transmitter during a dwell time during which the radar beam traverses a target of interest, a power supply arrangement operative normally to supply power to said transmitter and means for supplementing said power supply during periods in which the average power output of the radar transmitter is increased.

Normally said means for increasing said average power output of the radar transmitter is such that said average power output is increased above its rated mean power output.

The term dwell time is understood to mean the time taken for the radar beam to rotate through one beam width. Preferably said increase in the average power output of the transmitter is arranged to be effective for a period of from one to five dwell times, but no longer.

In practice, high power radar transmitter tubes have outputs which are specified by two ratings. One rating is the peak output power which can be sustained for a few micro-seconds only. The other rating is the mean power, that is to say the average power which can be sustained for long periods of time, i.e. for some thousands of hours. Normally in carrying out the present invention increasing the power of the transmitting tube beyond its rated peak power would be avoided.

The arrangement should be such that the transmitter is afforded a period of recovery before its average power output is again increased during a dwell time. Preferably the period of recovery is of the order of the period of one complete scan, but in some cases the period of recovery may be a substantial fraction of the period of one complete scan where, for example, there are two or three targets of interest on substantially different bearings.

Typically the increase in rated mean power is 10 dB.

In practice the average power output may be increased by increasing the output power or the pulse duration or the pulse repetition rate. It is possible to increase the average power output by any combination of the aforementioned three methods. In a practical example of radar system in accordance with the present invention a simple wide band non-squinting antenna, as described in the specification of our U.K. Pat. No. 1,148,888, is rotated continuously at constant speed so as to provide a dwell time of the order of 10 milliseconds. The pulse repetition rate of the radar is arranged to be increased by a factor of 10 for the period of three dwell times, whilst the beam is traversing a target of interest so that the average power transmitted increases by 10 dB. In order to avoid range ambiguities the increasing of the pulse rate by a factor of 10 is accomplished by utilizing ten radar frequencies in sequence so that for each frequency the radar operates at its original pulse repetition rate. In addition to the avoidance of range ambiguities the availability of ten independently chosen radar frequencies may be utilized to improve the radar performance under hostile jamming conditions.

Preferably said normally operative power supply arrangement comprises a plurality of individual power supplying inverters each arranged to be supplied from a power source, said inverters being arranged to supply power to said transmitter sequentially and in turn and said means for supplementing said power supply arrangement comprises means for causing all of said inverters to supply power to said transmitter in unison during periods in which the average power output of said transmitter is increased.

Preferably in the output path of each inverter to a common supply point for said transmitter is included a re-circulatory current inductive circuit which is such that current in said re-circulatory inductive circuit tends to be maintained after that inverter ceases to supply power in its turn.

Preferably said re-circulatory current inductive circuit comprises a bridge rectifier arrangement having one of its corners connected to the output path of the inverter, an opposite corner connected to the common supply point for said transmitter and an inductor connected across the remaining corners of said bridge, the rectifiers in the arms of said bridge being so poled that current in either direction always passes in the same direction through said inductor.

Preferably said power supply arrangement includes a chargeable pulse forming network and means for discharging said pulse forming network in parallel with said power source as said average power output of said radar transmitter is increased.

The invention is illustrated in and further described with reference to the accompanying drawing which is a block schematic diagram of one example of radar system in accordance with the present invention.

Referring to the drawing, the radar transmitter is represented by the block 1. This comprises (not separately shown) a simple wide band non-squinting antenna, as described in the specification of U.K. Pat. No. 1,148,888, which is rotated continuously at constant speed so as to provide a dwell time of the order of 10 milliseconds. The pulse repetition rate of the radar is arranged to be increased by a factor of 10 for the period of three dwell times, whilst the beam is traversing a target of interest so that the average power transmitted increases by 10 dB. In order to avoid range ambiguities the increasing of the pulse rate by a factor of 10 is accomplished by utilizing ten radar frequencies in sequence so that for each frequency the radar operates at its original pulse repetition rate.

The source of power for the transmitter 1 is represented by the block 2. This source may, in addition, be utilized to drive other apparatus. The power source 2 is connected via a smoothing arrangement represented by the inductor 3 and capacitor 4 to supply each of a series of individual inverters 5, 6, 7, 8 and 9. Each inverter 5 to 9 is arranged to supply power in sequence and in turn, during normal operation, to the primary winding of a transformer 10, from the secondary winding of which the transmitter 1 derives power. The control means for achieving this will not be described in detail but may be considered to comprise a suitable clock and, within each inverter, a suitable clock controlled switching circuit.

Connected in the output path from each inverter 5 to 9 to the primary winding of transformer 10 is a re-circulatory current inductive circuit 11, 12, 13, 14 and 15 respectively. Each re-circulatory current inductive circuit 11 to 15 is similar and only that referenced 11 will be described in detail.

The circuit 11 consists of a rectifier bridge circuit, one corner 16 of which is connected to the output of inverter 5, whilst the opposite corner 17 of which is connected to the primary winding of transformer 10. Across the remaining corners of the bridge circuit 11 is connected an inductor 18. The arms of the bridge contain rectifiers 19, 20, 21 and 22 which are so poled that current in either direction always passes in the same direction through inductor 18. Thus, during normal operation, when, in its turn, inverter 5 ceases to supply power to transformer 10 current tends to continue to circulate around bridge circuit 11.

The re-circulatory current inductive circuits 12, 13, 14 and 15 operate in similar fashion.

A control signal is arranged to be supplied to the inverters 5 to 9 via leads 23 from a clock 30 coupled with the transmitter 1 and leading to clock controlled switching circuits 31 associated with each of the inverters 5 to 9 so that as the average power output of the transmitter 1 is increased so, during that period of increased average power output, all of the inverters 5 to 9 are controlled to act in unison.

Re-circulatory current inductive circuits 11 to 15 are provided in order to ensure that the change over from inverter to inverter during normal operation is smooth. Whilst the re-circulatory current inductive circuits 11 to 15 are shown as containing a simple inductor such as inductor 18, this may take the form of an inductive network.

In addition to the power supply source 2, a pulse forming network conventionally represented at 24 is arranged to be charged during periods of normal operation of the transmitter 1. At these times the pulse forming network 24 is arranged to derive its charge from the power supply source 2. The pulse forming network 24 is connected via a silicon controlled rectifier 25, which is also connected to the clock 30 by one of the leads 23 for control by the clock 30, across the primary winding of a transformer 26, the secondary winding of which is connected in parallel with the connection of the power supply source 2 to the inverters 5 to 9. Rectifier 27 is provided merely as a d.c. blocking device.

Silicon control rectifier 25 is controlled from the control lead 23 so as to be rendered conductive as the average power output of the transmitter 1 is increased, whereby the energy stored in the pulse forming network 24 is applied to supplement the energy supplied direct from the power supply 2 to the inverters 5 to 9.

Pulse forming network 24 may either be arranged to be recharged rapidly so as to be in a state of readiness at an early stage, or it may be arranged to be charged more slowly during the period of recovery afforded the transmitter, depending upon the requirements in any particular case.

I claim:

1. A radar system comprising a radar transmitter having a rated output and a power supply arrangement connected to said radar transmitter and operative normally to supply power to said transmitter to obtain an average power output, and power output increasing means for increasing the average power output of the radar transmitter during a dwell time during which the radar beam traverses a target of interest, said power output increasing means including means for supplementing said power supply during periods in which the average power output of the radar transmitter is increased.

2. A system as claimed in claim 1 and wherein said means for increasing said average power output of the radar transmitter comprises means for increasing the average power output above its rated mean power output.

3. A system as claimed in claim 2 wherein the means for increasing the average power output comprises means for increasing the rated mean power in the order of 10 dB.

4. A system as claimed in claim 2 wherein the means for increasing the average power comprises means for increasing the output of said power supply.

5. A system as claimed in claim 2 and wherein said normally operative power supply arrangement comprises a power source and a plurality of individual power supplying inverters each arranged to be supplied power from said power source, said inverters being arranged to supply pulsed power to said transmitter sequentially and in turn, and said means for supplementing said power supply arrangement comprises means for causing all of said inverters to supply power to said transmitter in unison during periods in which the average power output of said transmitter is increased.

6. A system as claimed in claim 5 and wherein in the output path of each inverter to a common supply point for said transmitter is included a re-circulatory current inductive circuit which is such that current in said re-circulatory inductive circuit tends to be maintained after that inverter ceases to supply power in its turn.

7. A system as claimed in claim 6 and wherein said re-circulatory current inductive circuit comprises a bridge rectifier arrangement having one of its corners connected to the output path of the inverter, an opposite corner connected to the common supply point for said transmitter and an inductor connected across the remaining corners of said bridge, the rectifiers in the arms of said bridge being so poled that current in either direction always passes in the same direction through said inductor.

8. A system as claimed in claim 2 and wherein said power supply arrangement includes a chargeable pulse forming network and means for discharging said pulse forming network in parallel with said power source as said average power output of said radar transmitter is increased.

9. A system as claimed in claim 2 and wherein said normally operative power supply arrangement comprises a power source and a plurality of individual power supplying inverters each arranged to be supplied power from said power source, said inverters being arranged to supply pulsed power to said transmitter sequentially and in turn, and said means for supplementing said power supply arrangement comprises means for increasing the duration of said pulsed powder.

10. A system as claimed in claim 2 and wherein said normally operative power supply arrangement comprises a power source and a plurality of individual power supplying inverters each arranged to be supplied power from said power source, said inverters being arranged to supply pulsed power to said transmitter sequentially and in turn, and said means for supplementing said power supply arrangement comprises means for increasing the repetition rate of said pulsed power.

* * * * *